June 26, 1962  W. HAUSMANN ETAL  3,040,588
CONTROL ARRANGEMENT FOR POWER-TAKE-OFF SYSTEMS
Filed March 15, 1960  3 Sheets-Sheet 1

W. Haüsmann
K. Hentschel
*INVENTORS.*

BY

*AGENT.*

3,040,588
CONTROL ARRANGEMENT FOR POWER-TAKE-OFF SYSTEMS
Werner Haüsmann, Uthleben, near Nordhausen, and Klaüs Hentschel, Nordhausen, Harz, Germany, assignors to VEB Schlepperwerk Nordhausen, Nordhausen, Harz, Germany, a corporation of Germany
Filed Mar. 15, 1960, Ser. No. 15,231
10 Claims. (Cl. 74—15.86)

The present invention relates to power-take-off systems of automative vehicles (e.g. agricultural tractors) and, more particularly, to a control arrangement for such installations.

Auxiliary and power-take-off shafts for automotive vehicles such as agricultural tractors have been provided at the front, rear and sides of the vehicle to drive the various accessories (e.g. belt pulleys, mowers, fertilizers, seeders and the like) associated therewith. While it has been the practice, heretofore, to provide controls for connecting these auxiliary shafts with either the driving engine or the speed-changing transmission of the vehicle, each power-take-off or auxiliary shaft previously required an independent, individually constituted and generally complicated control unit, housed adjacent its shaft extremity protruding from the vehicle.

It is an object of the present invention to provide a simplified control arrangement for power-take-off installations.

It is another object of the invention to provide a control arrangement for power-take-off installations wherein most of the members of the control apparatus may be centrally and conveniently positioned in the vehicle.

It is a more specific object of this invention to provide independent yet substantially identical elements for the control of the drive of a plurality of auxiliary shafts, optionally includable in the system, whereby the problems of manufacture and assembly are considerably simplified.

In accordance with the present invention there is provided, in a vehicular power-take-off system with a plurality of parallel and/or co-axial power-take-off shafts which are to be selectively coupled with one or more sources of motive power therefor, a common supporting rod for a plurality of shifting elements respectively associated with these shafts, the rod extending in a direction parallel to the shaft axes and being preferably displaceable in this axial direction to act as a conveniently accessible extension of at least one such element. This rod, accordingly, may carry one shifting element, rigidly connected with it, for the control of a coupling member such as a clutch or a sliding gear associated with one of these shafts while further carrying one or more additional shifting elements, loosely slidable thereon, for the control of other coupling members associated with the remaining shaft or shafts. The shifting elements, or some of them, may be structurally identical with one another, and with a further control member serving for the displacement of the rod itself, except for the presence or absence of extensions thereon engaging the coupling members controlled thereby. The source of motive power may comprise the vehicle engine and/or a conventional speed-changing transmission driven by it.

The above and other objects, features and advantages of the instant invention will become more fully apparent from the following detailed description, reference being made to the accompanying drawing in which.

Figure 1:
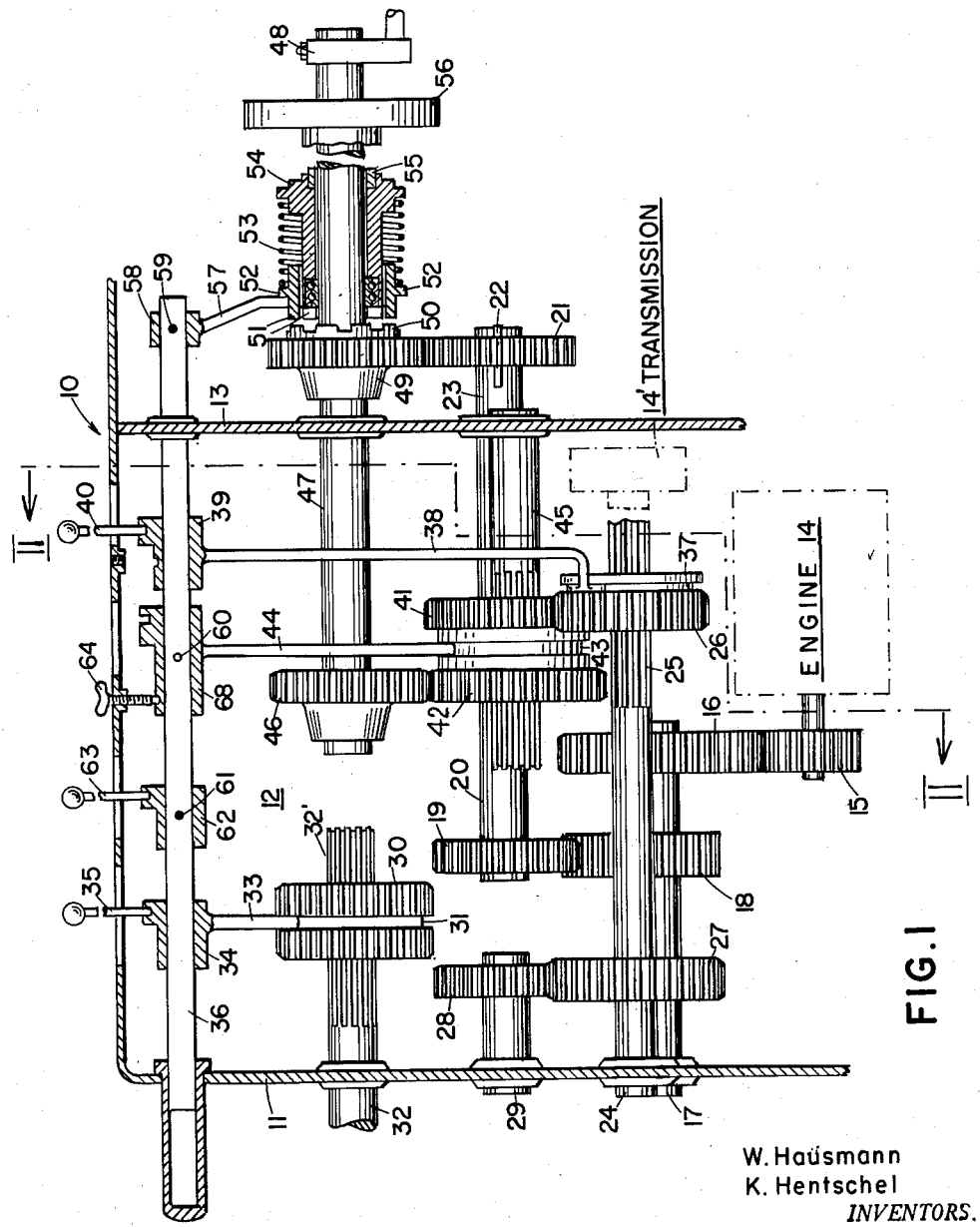
FIG. 1 is a side-elevational view of a power-take-off system embodying the invention.
Figure 2:
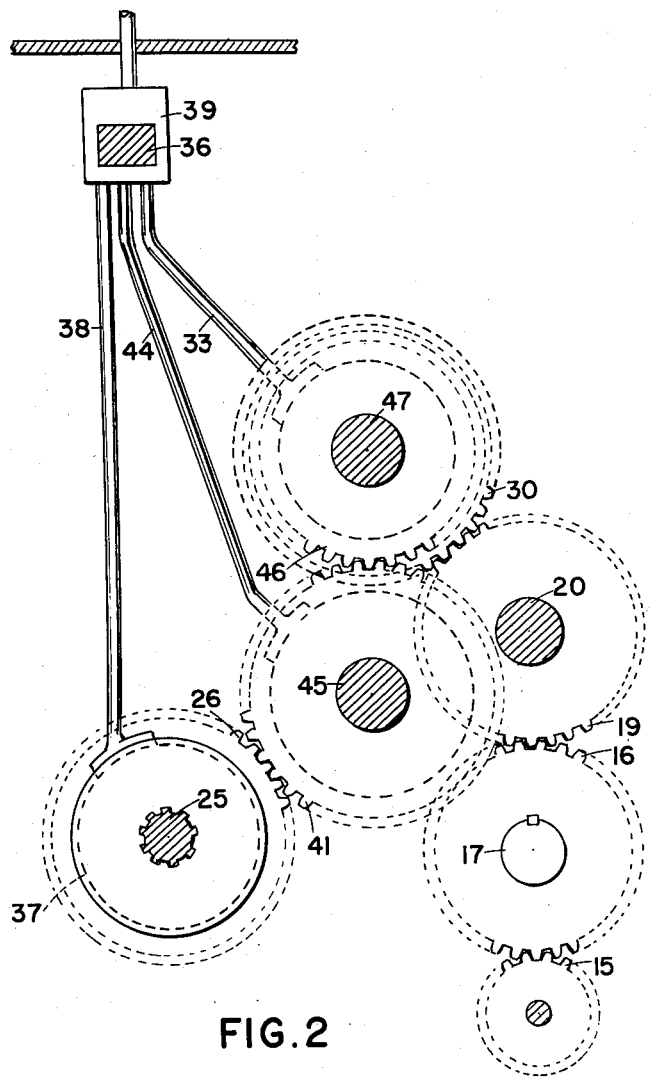
FIG. 2 is a cross-sectional view of the system taken on line II—II of FIG. 1.

In FIGS. 1 and 2 there is shown part of an agricultural tractor 10 having an engine chamber 12 within a housing whose walls 11 and 13 rotatably support the several parallel horizontal shafts described hereinafter. Chamber 12 contains a conventional automotive engine 14 and a speed-change transmission 14′ suitable for agricultural tractors. A pinion gear 15, driven by the engine 14, continuously rotates a gear 16 in mesh therewith and keyed, along with a gear 18, to a drive shaft 17. Gear 18, in turn, meshes with a gear 19 carried by a shaft 20. A similar gear 28 is secured to an idler shaft 29. A shiftable gear 30 is selectively engageable either with gear 19 driven by the engine 14 or with gear 28 which is driven by the transmission 14′ by its engagement with a gear 27 secured to transmission shaft 24. Gear 30 is axially displaceably mounted on the splined extremity 32′ of a front power-take-off shaft 32. The splined portion 25 of drive shaft 24 carries an axially displaceable gear 26, adapted to mesh with a double gear 41, 42 on an auxiliary spline shaft 45. The double gear 41, 42 is further engageable with a gear 46, secured to a rear power-take-off shaft 47 which extends beyond housing wall 13. Shaft 47 may be linked to an agricultural implement, such as a silage unloader, via a crank 48 or similar transmission means. Shaft 47 also serves to support a gear 49, freely rotatable thereon, which is provided with clutch teeth 50 adapted to engage a complementary set of teeth 51 on a clutch sleeve 52. A hollow shaft 55 is co-axially mounted on the projecting rear extremity of shaft 47 for rotation relative thereto. The clutch sleeve 52 is keyed for relative axial displacement to a tubular extension 54 of shaft 55, a shoulder on this extension serving as a seat for a compression spring 53 which urges the clutch sleeve 52 into engagement with gear 49. Gear 49 meshes with a gear 21 which is removably secured, by a key 22, to the rearwardly projecting extremity 23 of engine-driven shaft 20.

Shiftable gear 30 is provided with an annular groove 31 adapted to receive a shifting fork 33; the latter is rigidly connected to a shifting block 34 which is horizontally slidable on a shifting rod 36 extending parallel to the gear shafts. Shifting block 34 is engaged by a manually operable lever 35, schematically shown, whose displacement to the left (FIG. 1) will cause gear 30 to mesh with gear 28, driven via gear 27 from transmission 14′. A displacement of the lever 35 to the right will cause gear 30 to mesh with gear 19, driven from engine 14 via a gear train consisting of gears 18, 16 and 15. In the right-hand position of gear 30, therefore, the front power-take-off shaft 32 will be driven by the engine 14, in the left-hand position the shaft 32 will be driven from the transmission 14′, and in an intermediate position, with gears 30 disengaged from both gears 19 and 28, the shaft 32 is stopped.

The double gear 41, 42 is fixed against axial displacement by a screw 64 which bears upon a shifting block 68 whose fork 44 is received in a groove 43 of this double gear. One gear member 42 of the latter is locked in mesh with gear 46, while the other gear member 41 may be engaged by the gear 26 driven by the transmission 14′. Gear 26 is provided with a groove 37 to receive a shifting fork 38 which is rigidly affixed to a shifting block 39 slidable on rod 36. The sliding block 39 is provided with a shifting lever 40 which, upon displacement to a right-hand position, withdraws the gear 26 from engagement with member 41 to disconnect the drive for rear power-take-off shaft 47. In its left-hand position, gear 26 meshes with member 41 while member 42 engages gear 46 to drive the power-take-off shaft 47 from the transmission.

Another actuating element in the form of a slidable block 62, fastened to the shifting rod 36 by a pin 61, is provided with a shift lever 63 adapted longitudinally to displace the shifting rod within its socket in housing wall 11. On the right-hand extremity of rod 36, projecting rearwardly from the engine chamber, there is mounted a boss 58, secured to the rod by a pin 59, which carries a bar 57 adapted to restrain the axial displacement of sleeve 52 under pressure from spring 53. In a left-hand position of lever 63, bar 57 permits the sleeve 52 to engage the gear 49 which then drives the hollow shaft 55 via its tubular extension 54. A pulley 56 is secured to the latter to drive another agricultural implement, such as a silage blower, concurrently with the implement powered by the transmission-driven inner shaft 47. Outer power-take-off shaft 55 is driven from the engine 14 by the clutch 50, 51 and by a gear train including gears 15, 16, 18, 19, 21 and 49.

Figure 3:
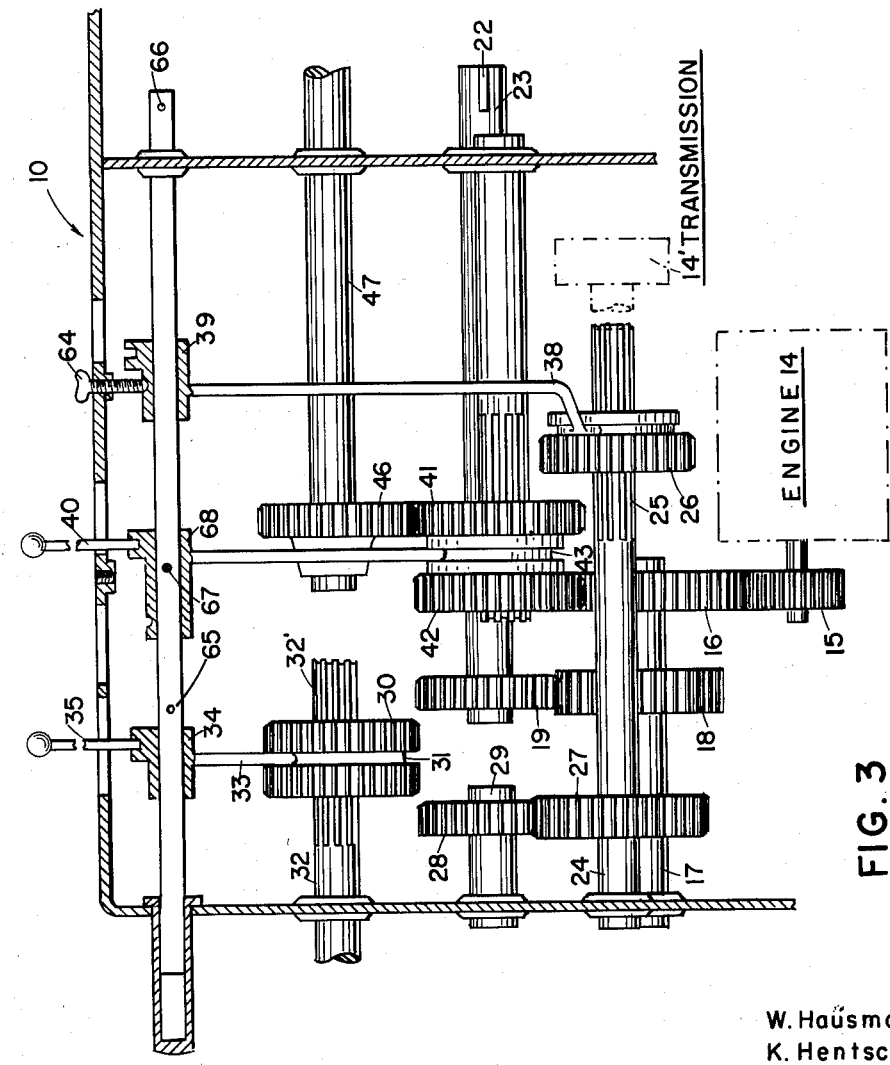
FIG. 3 is a view similar to FIG. 1, showing the system stripped of some of its parts.

In FIG. 3 there is shown an adaptation of the assembly of FIGS. 1 and 2 to a power-take-off system which does not require concurrently operating rear power-take-off shafts. Thus, the hollow shaft 55 and its clutch assembly as well as the gear 21, adapted to drive the gear 49, have been removed. Block 68, freed from its anchor screw 64, is now fitted with the shift lever 40 heretofore associated with block 39 which in turn is now immobilized by the screw 64. Pin 61, which previously entered a bore 65 in rod 36 to lock the block 62 to the rod, now passes through a bore 60 thereof to limit the mobility of the rod 36 by joining it to block 68; block 62 and boss 58, both functionless in a system as shown in FIG. 3, have been stripped from the rod.

When the driver of the tractor operates the lever 40 in FIG. 3 to shift the double gear 41, 42 to an extreme left-hand position, member 42 meshes with gear 16 while member 41 meshes with the gear 46 to drive the sole rear power-take-off shaft 47 from the engine via gear 15. In an extreme right-hand position of lever 40, member 41 meshes with gear 26 while member 42 meshes with gear 46 to drive the shaft 47 from the transmission 14'. In an intermediate position, neither member 41 nor member 42 engages gear 46 so that the shaft 47 is brought to a stop.

It will be apparent that a great variety of switching operations may be carried out while using similar or identical shifting blocks or actuating elements carried by the rod 36. The arrangement shown permits of the use of mass-production techniques in the production of power-take-off assemblies, although a variety of different types may be desired.

The invention described and illustrated is believed to admit of many modifications and variations readily apparent to persons skilled in the art and intended to be included within the spirit and scope of the invention except as further limited by the appended claims.

What is claimed is:

1. In a vehicular power-take-off system, in combination, a housing, a first power-take-off shaft extending from said housing, a second power-take-off shaft co-axially journaled to said first power-take-off shaft, drive means for said shafts, said drive means including a first and a second drive shaft operable at different speeds, a source of motive power for said drive means, a first gear rigid on said first power-take-off shaft, a second gear loose on said first power-take-off shaft, first coupling means operatively linking said first gear with said first drive shaft, second coupling means operatively linking said second gear with said second drive shaft, and clutch means on said second gear and on said second power-take-off shaft operable to join the latter to said second gear for rotation under the control of said second drive shaft.

2. In a vehicular power-take-off system, in combination, a housing, a first power-take-off shaft extending from said housing, a second power-take-off shaft co-axially journaled to said first power-take-off shaft, drive means for said shafts, said drive means including a first and a second drive shaft operable at different speeds, a source of motive power for said drive means, a first gear rigid on said first power-take-off shaft, a second gear loose on said first power-take-off shaft, first coupling means operatively linking said first gear with said first drive shaft, second coupling means operatively linking said second gear with said second drive shaft, clutch means on said second gear and on said second power-take-off shaft operable to join the latter to said second gear for rotation under the control of said second drive shaft, and control means for said first coupling means operable for establishing alternative operative linkages between said first gear and either of said drive shafts whereby said first power-take-off shaft can be selectively controlled from said first and second drive shafts.

3. The combination according to claim 2 wherein said first coupling means comprises an auxiliary shaft and a double gear shiftable on said auxiliary shaft, said control means including mechanism for axially immobilizing said double gear on said auxiliary shaft in an operative state of said second coupling means and for selectively displacing said double gear on said auxiliary shaft upon an inactivation of said second coupling means.

4. The combination according to claim 3 wherein said mechanism includes an axially shiftable rod extending parallel to all of said shafts, a guide element engaging said double gear and slidable on said rod, and locking means for alternatively securing said guide element to said housing and to said rod, said clutch means including an arm removably carried on said rod.

5. The combination according to claim 4, further comprising a third power-take-off shaft parallel to said rod, third coupling means including a further double gear axially slidable on the last-mentioned shaft for selectively establishing an operative linkage between it and either of said drive shafts, and a further guide element slidable on said rod for controlling said further double gear.

6. In a vehicular power-take-off system, in combination, a housing, a first power-take-off shaft extending from said housing, a second power-take-off shaft co-axially journaled to said first power-take-off shaft, an engine provided with a first drive shaft, a speed-changing transmission driven from said engine and provided with a second drive shaft, a first gear rigid on said first power-take-off shaft, a second gear loose on said first power-take-off shaft, first coupling means operatively linking said first gear with said first drive shaft, second coupling means operatively linking said second gear with said second drive shaft, and clutch means on said second gear and on said second power-take-off shaft operable to join the latter to said second gear for rotation under the control of said second drive shaft.

7. In a vehicular power-take-off system, in combination, a housing, a horizontal first power-take-off shaft extending from said housing, a horizontal second power-take-off shaft coaxially journaled to said first power-take-off shaft, an engine provided with a horizontal first drive shaft, a speed-changing transmission driven from said engine and provided with a horizontal second drive shaft, a first gear rigid on said first power-take-off shaft, a second gear loose on said first power-take-off shaft, first coupling means operatively linking said first gear with said first drive shaft, second coupling means operatively linking said second gear with said second drive shaft, clutch means on said second gear and on said second power-take-off shaft operable to join the latter to said second gear for rotation under the control of said second drive shaft, and control means for said first coupling means operable for establishing alternative operative linkages between said first gear and either of said drive shafts whereby said first power-take-off shaft can be selectively controlled from said first and second drive shafts.

8. The combination according to claim 7 wherein said first coupling means comprises a horizontal auxiliary shaft and a double gear shiftable on said auxiliary shaft, said control means including mechanism for axially immobilizing said double gear on said auxiliary shaft in an operative state of said second coupling means and for selectively displacing said double gear on said auxiliary shaft upon an inactivation of said second coupling means.

9. The combination according to claim 8 wherein said mechanism includes an axially shiftable horizontal rod, a guide element engaging said double gear and slidable on said rod, and locking means for alternatively securing said guide element to said housing and to said rod, said clutch means including an arm removably carried on said rod.

10. The combination according to claim 9, further comprising a horizontal third power-take-off shaft, a third coupling means including a further double gear axially slidable on the last-mentioned shaft for selectively establishing an operative linkage between it and either of said drive shafts, and a further guide element slidable on said rod for controlling said further double gear.

References Cited in the file of this patent

UNITED STATES PATENTS

| | | |
|---|---|---|
| 1,145,236 | Fay | July 6, 1915 |
| 2,210,998 | Baker et al. | Aug. 13, 1940 |
| 2,276,000 | Stumpf | Mar. 10, 1942 |
| 2,548,994 | Miller et al. | Apr. 17, 1951 |
| 2,661,634 | Bechman et al. | Dec. 8, 1953 |
| 2,793,533 | Swenson et al. | May 28, 1957 |
| 2,817,408 | Klemm | Dec. 24, 1957 |
| 2,821,868 | Gregory | Feb. 4, 1958 |

FOREIGN PATENTS

| | | |
|---|---|---|
| 10,416 | Great Britain | May 3, 1906 |
| 279,242 | Great Britain | Oct. 27, 1927 |
| 336,696 | Germany | May 11, 1921 |
| 924,478 | Germany | Mar. 3, 1955 |